July 30, 1963 R. M. HENRICKSON 3,099,516
METHOD OF MOLDING A FOAM PLASTIC HAVING SKINS
ON SELECTED SURFACE PORTIONS
Filed Aug. 29, 1960 2 Sheets-Sheet 2

INVENTOR.
RUSSELL M. HENRICKSON
BY
AGENT

United States Patent Office 3,099,516
Patented July 30, 1963

3,099,516
METHOD OF MOLDING A FOAM PLASTIC HAVING SKINS ON SELECTED SURFACE PORTIONS
Russell M. Henrickson, Willow Grove, Pa., assignor, by mesne assignments, to Philco Corporation, Philadelphia, Pa., a corporation of Delaware
Filed Aug. 29, 1960, Ser. No. 52,695
4 Claims. (Cl. 18—48)

This invention relates generally to foam plastics and more particularly to an improved method and means for fabricating foam plastic structures and to the article of manufacture produced by such method. The invention, while of broader applicability, will be described with specific reference to its use in the refrigeration art.

As a matter of nomenclature the term "foam plastic" as used herein is to be given a generic connotation as referring to urethane linkages produced by the reaction of an isocyanate with a suitable hydroxyl bearing compound, the reaction employing some method of gas formation to make the material foam. Urethane polymers are most commonly prepared by reacting a diisocyanate with a hydroxyl terminated polyether or polyester. Foam designations coming within the ambit of the term "foam plastic," and used hereinafter interchangeably are the foams referred to as urethane, polyurethane, and isocyanate foams. The properties of such foams can be varied widely by changing the relative amounts of the reactants. By selection in kind of the reactants the amount of cross-linking can be regulated, which factor determines the rigidity characteristics of the foam. Through proper blending of these ingredients a wide spectrum of physical properties can be obtained. In addition to the nature of the main foam-producing ingredients minor amounts of certain materials are usually added to modify or control the reaction. A catalyst such as a tertiary amine is generally used to accelerate the reaction between the isocyanate and hydrogen-containing compound. Emulsifiers may also be added to facilitate the mixing of the ingredients and to promote uniform cell size.

The three basic techniques currently employed for making foams are classified as a complete prepolymer, a quasi prepolymer, and a one-shot system. In the complete prepolymer system all of the base resin is reacted with the isocyanate, the system having a slight excess of isocyanate. To this is added an accelerator composed of amines plus a foaming agent. The quasi-prepolymer system is one in which approximately half the resin is reacted with the isocyanate component with a sufficient excess of isocyanate being employed to react with the second half of the resin when it is later added along with the amines and a blowing agent. When the constituents are mixed they react to produce a urethane linkage, the blowing agent necessary to foam the reactant mass being triggered by the exothermic heat of reaction or being produced chemically by the interaction of isocyanate with water to produce $CO_2$ gas. In the one-shot system there is no pre-reacting of resin and isocyanate but simply a mixture at one time of all the raw materials under very carefully controlled conditions to form a finished foam. While the invention is equally applicable to any of the above described systems its application will be described specifically in relation to its use in a quasi-prepolymer system.

With the advent of fluorocarbons as blowing agents there is no longer any necessity for using an excess of isocyanate and water to produce carbon dioxide gas as the foaming medium.

One of the more promising areas in which foam plastics have found increasing use is in the structural field. Their use, however, as structural members, has been limited for the reason that the cellular core structure has a very low abrasion resistance. Additionally because of the foam's inherent physical weakness, the foam is normally used only as a filler or core material between existing structural members. While the strength properties of the foam per se are not readily modified, given a certain fixed core density, certain techniques are available, such as honeycombing or interlacing the foam with reinforcing ribs, for improving its load-bearing capacity. These procedures, however, are not only expensive and time-consuming but often incapable of practical application because of the configuration of the part or location of the use. An alternative, but equally inefficient procedure is to laminate a facing of metal, plywood or other material of sufficient physical strength to the foam plastic core and to use the resulting composite assembly as the structural member.

Accordingly, it is a general object of this invention to provide a method which eliminates the multistep processes necessary for the fabrication of foam plastic structures typical of the prior art and to provide a simplified method for improving the strength properties of foam structures without the necessity of resorting to pre-formed structural reinforcing members.

It is another object of this invention to provide a process which provides for self generation by the foam, during its process of synthesis, of a hard, durable skin or coating on selected surface portions of the foam.

Another and more particularized object of the invention is to provide a process of fabricating foam structures which eliminates the need, when required for example by strength considerations, of adhering a separate pre-formed member to the foam body, and permits generation of a surface coating of predetermined physical characteristics on selected surface portions of the foam matrix during evolution of the foam.

A further and correlative object is to provide a novel and improved article of manufacture deriving from practice of the method teachings of this invention.

A still further object of the invention is to provide unique means for the fabrication of foam plastic structures.

The above mentioned and other objects within contemplation will be more readily understood by reference to the accompanying detailed description and drawings in which.

Briefly described, the invention in its method aspect relates to a novel technique for producing, during foam formation, a self-generated skin on selected surface portions of the cellular core. The technique simply stated is to subject those surfaces of the foam on which a skin is ultimately required to a temperature below that at which effective vaporization of the blowing agent can occur. By "below effective vaporization" is simply meant that point at which the blowing agent, even though possibly vaporized from a technical standpoint, is ineffectual as a foaming agent in forming cells in the tender or uncured plastic mass.

In accomplishment of the foregoing general objectives and features I have found that a hard durable coating can be readily obtained on preselected surface portions of the foam by bringing the foam-generating mass into contact with a relatively cool surface during the formation stages of the process. Moreover, it has been found that by regulating the temperature of the cooling surface the physical characteristics of the surface coating, such as for example its density, abrasion resistance and impact strength may be predictably and controllably modified over a relatively wide range of selection.

The significance of this achievement will be cast in more meaningful perspective if it is understood that a six to one increase in density, a ratio which is readily attainable through practice of the present invention, results in a 15 to 1 increase in the overall strength properties of the foam. By the simple but unique process of cooling preselected surface portions of the foam during its formation a structural member may be custom fabricated for a particular application in a single, continuous, unified process without the necessity of assembling pre-formed structural parts and thereby completely eliminating the expensive and time consuming techniques of the prior art.

As indicated above, the invention for illustrative purposes will be described in relation to its use in the refrigeration art.

It is conventional practice in the fabrication of insulative structure such as refrigerator doors to employ a metal outer shell and a separate preformed inner plastic liner and to hand insert in the space between these members bats of insulative material. This practice, however, is time consuming and, in applications where intricate liner shapes are employed, is often unsatisfactory in that the insulation may not properly conform to the convoluted contours of the liner resulting in uninsulated voids and consequent reduction in thermal efficiency. Moreover, the use of a separate liner makes the manufacturing process more costly from the standpoint of required storage facilities and complicates the assembly procedures necessary to the fabrication of the finished part.

Figure 1:
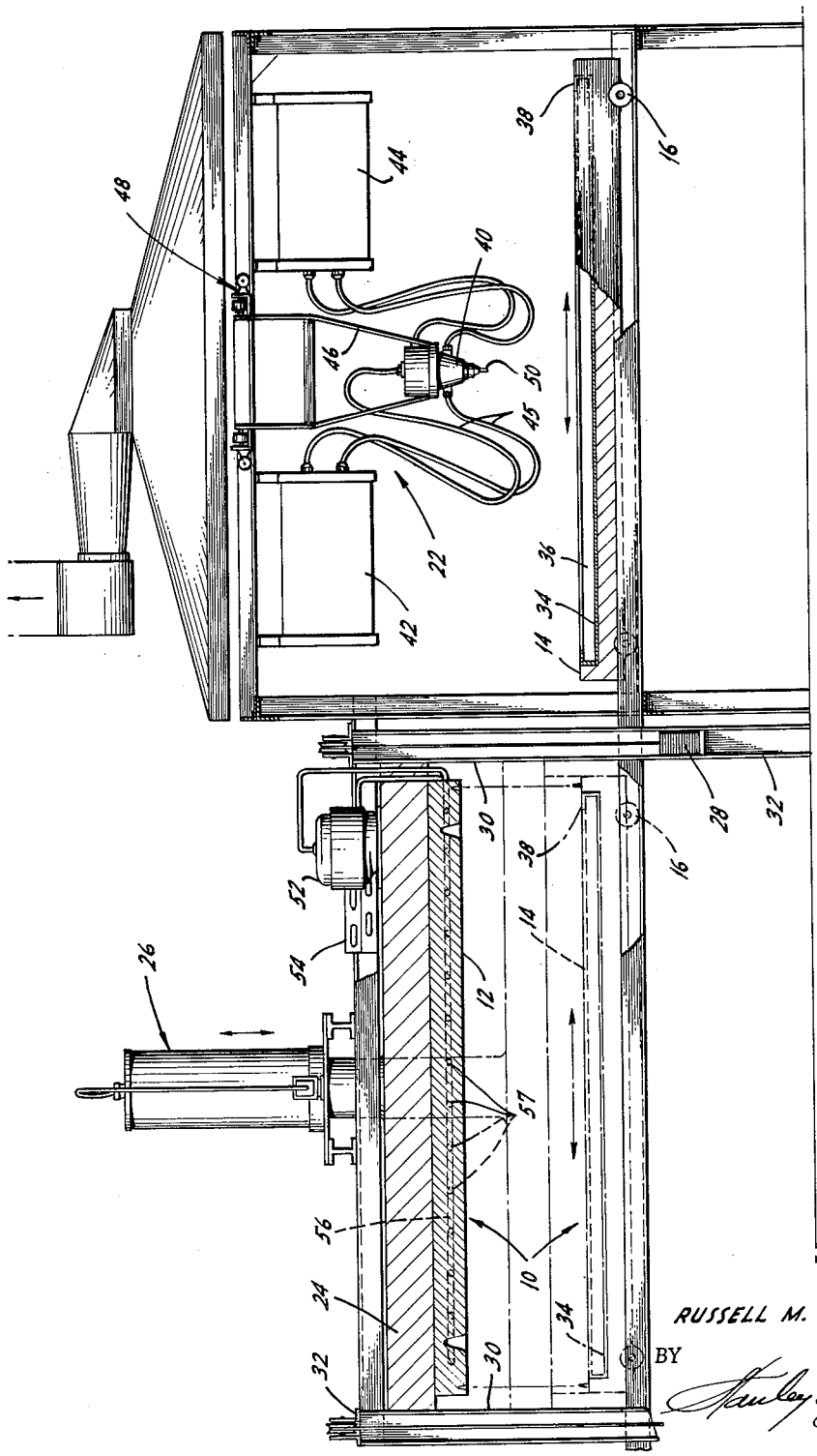
FIGURE 1 is an elevational view showing one type of apparatus for practicing the method steps of the invention.

In particular accordance with the invention and referring to FIGURE 1 there is shown one illustrative form of apparatus for adapting this invention to the manufacture of a refrigerator door and to the avoidance of problems such as those briefly referred to above. The inventive method of door fabrication is to form the entire door in a single operation by confining a charge of foam reactants within a suitably contoured mold and then forming a hard durable coating on desired surface portions of the finished foam by maintaining those parts of the mold designed to form such surface portions at a reduced temperature during core expansion. Localized cooling of this nature permits polymerization of the foam reactants at or near the cooling surface while preventing effective vaporization of the particular blowing agent employed thereby permitting the formation of a smooth surface coating integrally united to the underlying cellular matrix.

The apparatus as shown in FIGURE 1 comprises partible mold means 10 having upper and lower die members 12 and 14. The lower die is provided with rollers 16 to permit movement of the die into registration with the foam-charging apparatus 22. The die is shown in its charging position to the right in FIGURE 1. The upper die 12 of the mold assembly 10 is carried by a platen 24, the platen and die being adapted for vertical reciprocation by the piston-cylinder assembly 26. For ease of movement the upper die is counterbalanced by weights 28 and is guided in its movement by ways 30 formed by framing channels 32.

One technique of fabricating a refrigerator door of foam plastic consists of placing a preformed metal 34, ultimately to comprise the outwardly exposed surface of a refrigerator food compartment door, into the cavity 36 of lower die 14. It should be understood, however, that the use of a shell is optional since the door may be formed independently of such a member and decorative panels of porcelainized steel, plastic, or other material adhered or attached to the face of the foam core after its ultimate formation. As an alternative procedure, the skin itself may be used as the outer exposed surface of the door.

Edge portions of the shell 34 are inturned as at 38 to form a mechanical interlock with the foam during its expansion. With the shell installed, the lower die 14 is wheeled into position under the mixing head 40 for receipt of metered portions of the foam-producing reactants. The two main constituents of the foam are contained within separate mixing tanks 42 and 44, the streams being independently maintained in fluid communication with the mixing head 40 by means of flexible insulated tubing 45.

To permit freedom of movement of the mixing head 40 it is suspended by framing 46 from a dual axis trolley 48. This arrangement allows for unrestricted biaxial movement of the mixing head and permits complete charging of an expansive mold cavity in minimal time.

One illustrative formulation of foaming reactants used in the fabrication of refrigeration structure was the employment as one constituent, 332 grams of resin derived from a polyhydroxyl compound reacted with a short chain organic oxide. A specific example of such a reaction is sorbital reacted with propylene oxide producing a polyether having an hydroxyl number of 500. To this is added 8 grams of dibutyl tin dilaurate as catalyst and 3 grams of silicone surfactant. The second ingredient comprises a prepolymer made from 535 grams of the above resin by accepted techniques and having an NCO/OH ratio of from 3.0 to 4.5, to which is added 133 grams of monofluorotrichloromethane as the foaming agent, the foaming reaction being triggered by the exothermic heat of reaction developed during generation of the foam. The reactants prior to use are separately maintained in tanks 42 and 44 associated with metering pumps, not shown. The prepolymer is maintained at about 50° F. and the resin at 90–100° F. Immediately prior to use the reactants are directed, by valving not shown, into a common mixing chamber contained within the mixing head 40 where the fluids are blended by a motor driven bit into a homogeneous mass for discharge as a confluent stream from nozzle 50.

Once the mold cavity 36 has been charged, the die 14 is immediately moved into registry with the upper die 12. Using the formulation specifically set out above, there is a quiescent period of about 30 seconds before the reaction commences. Since the charging sequence normally takes substantially less time than 30 seconds, there is adequate time for proper positioning of the lower die before foaming has progressed to any appreciable extent. When the die 14 is in the position shown in phantom in FIGURE 1, the upper die is lowered into locking engagement with it. To provide the required temperature control of the upper die, the die may be provided with a motor compressor unit 52 and a fin-tube condenser 54 connected in refrigerant flow circuit with an evaporator section 56 comprised of a plurality of interconnected conduits 57 traversing the upper die 12. To insure proper cooling of the mold surface the die is preferably made of a material having high thermal conductivity such, for example, as aluminum. One convenient manner of forming the desired refrigerant flow pattern is to employ a conventional roll bond construction. To simplify the layout of the refrigeration system the entire high side of the unit is carried by the upper die thereby eliminating the need for any flexble interconnection between the low and high sides of the refrigeration system.

Figure 3:
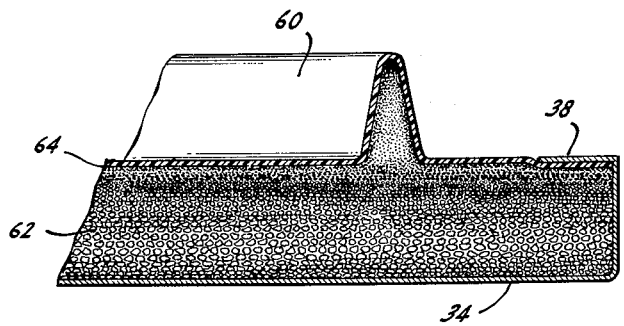
FIGURE 3 is a sectional view of structure produced by the practice of this invention employing apparatus of the type shown in FIGURE 1.

I have found that by maintaining the upper die at a relatively cool temperature compared to the temperature needed for effective vaporization of the blowing agent, there is produced on surface portions of the foam contiguous such refrigerated regions a smooth, hard, durable skin 60 of the type illustrated in FIGURE 3. This procedure may, if desired, be used to eliminate the need for a separate liner member and produce, in a one-step operation, a finished refrigerator door having an integrally formed hard durable surface coating or skin. Moreover, by modifying the temperature of the mold the physical characteristics of the self-generated skin may be varied over a considerable range of values, certain representative characteristics and their permissible range of modification being shown in FIGURE 5.

A segmental section of structure produced by the above described procedure is shown in FIGURE 3 and comprises a high density, abrasion resistant skin 60 integrally bonded to a low density cellular core 62. It will be noted that there is a size gradation in the cellular structure of the core as the outer cooled surface is approached. At some position within the foam, here designated as surface 64, and depending on the temperature at which the mold is maintained during forming of the part, there is a relatively abrupt transition from a cellular composition to a solid skin. By bringing the die 12 to a starting temperature of 45° F. and using the foam formulation set out above, a skin thickness of approximately 150 mils or roughly 5/32" thick was obtained.

Figure 5:
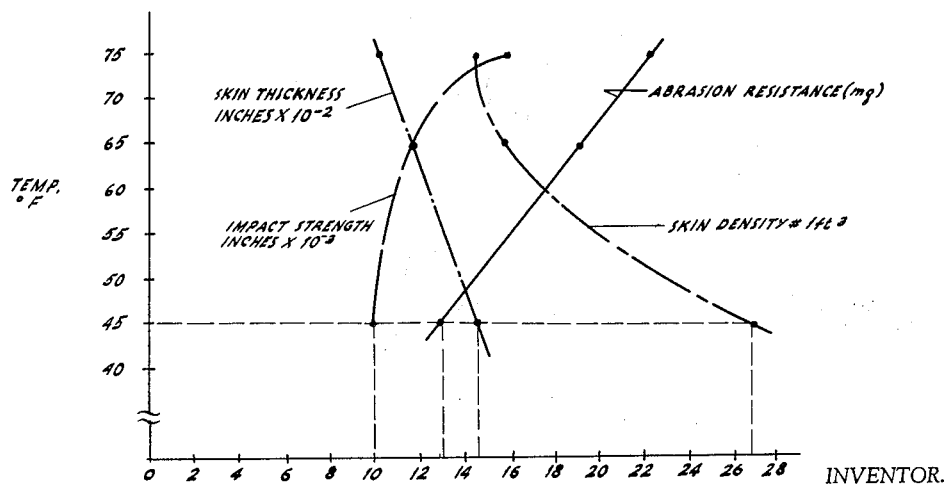
FIGURE 5 is a graph illustrating the range of control exercisable over certain representative physical characteristics of a foam structure produced by the method teachings of this invention.

Referring to the graph shown in FIGURE 5, it will be seen that by employing a mold temperature of 45° F. there is produced a composite structure having a skin density of approximately 26.8#/ft.$^3$. The core density of the foam although not shown had an average value of about 2#/ft.$^3$. In order to permit the use of a single graph the axis of abscissae has been given a series of absolute values which are to be interpreted in accordance with the legend associated with each curve. Accordingly, it will be seen, for example, that the skin produced under the conditions set forth above, has an impact strength, as measured by the depth of penetration of a 1.29 lb. ball having an effective diameter of 5/8 dropped from a height of 3 inches, of about 10 mils and an abrasion resistance of 13 milligrams determined by using a Tabor abrader and subjecting the surface of the skin to 1000 revolutions of a CS No. 10 Calibrase wheel loaded with 1500 gram weights on each side.

Figure 2:
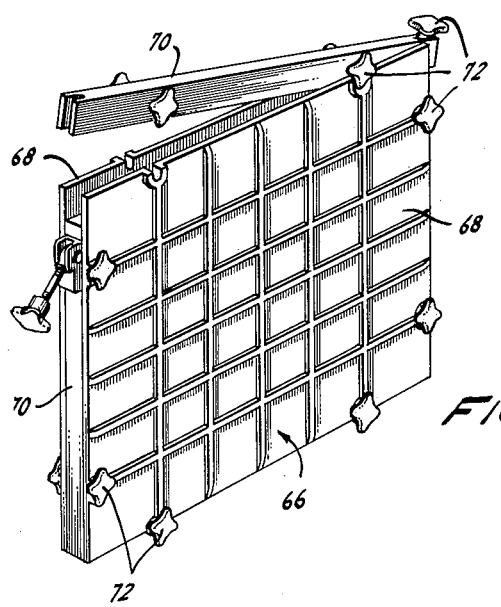
FIGURE 2 is a perspective view of another and simplified form of apparatus for achieving the objectives of this invention.
Figure 4:
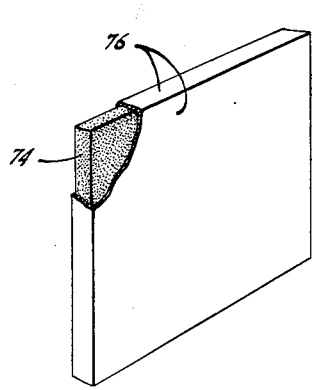
FIGURE 4 is a partially cut away perspective illustration showing structure of the type produced using the apparatus of FIGURE 2.

Another and more simplified form of apparatus for practicing the method concepts of this invention is the assembly 66 shown in FIGURE 2 comprising two ribbed aluminum plates 68 secured in spaced relation by framing bars 70; the structure being held together by clamping screws 72. The assembly, preparatory to foam injection, may be cooled by any suitable means, one technique being simply to place the entire assembly in a conventional refrigerator for the requisite period of time to bring the assembly to the desired operating temperature. When this temperature is reached one of the bars 70 is removed and the internal cavity of the structure charged with an appropriate admixture of foam reactants. The bar 70 which had been removed is then reclamped back in position and the reaction allowed to proceed to completion. By this procedure a structural form of the type shown in FIGURE 4 may be conveniently fabricated, the structure consisting of a cellular core 74 totally enclosed in a self-generated casing of hard durable skin 76. This structural form is readily usable as a load-bearing member and has been effectively employed in the fabrication of insulating structure for refrigeration apparatus. The integral nature of the skin and its manner of formation improves retention of the foaming agent by the cellular core and results in greater K (heat conductivity) factor stability. By employing a halogenated refrigerant as the blowing agent, such as monofluorotrichloromethane, K factor measured in B.t.u., per hr. per sq. ft. per deg. F. per in. lying within the range of from .11 to .14 may be readily attained.

The employment of a self-generated skin is similarly advantageous in applications involving prolonged exposure to high humidity conditions. Urethane foams, while not generally hygroscopic, have on occasion exhibited some tendency to swell when exposed to moisture.

While the exact theory underlying this invention has not yet been determined it is believed that exposure of surface portions of the expanding foam to a reduced temperature, acts to suppress vaporization of the foaming medium. This effect is thought to be brought about either as a result of increasing the viscosity of the reactant mass contiguous such cold front, thereby reducing its plasticity and increasing its resistance to cellular formation by the foaming medium, or by acting directly on the foaming agent by eliminating or reducing the vigor of the ebullitive process, or by a combination of these effects. In this connection it should be noted that the invention is equally applicable to chemically blown foams, exemplified by foams utilizing $CO_2$ gas generated by the interaction of diisocyanate and water, as it is to a process which employs the exothermic heat of the foaming reaction to produce vaporization of a separately provided blowing agent which does not itself enter into the chemical reaction, such for example as the halogenated refrigerants above mentioned.

In summary, I have discovered a unique process for fabricating foam plastic structures which provides for the formation and control, during foam synthesis, of a self-generated skin of predetermined physical characteristics on selected surface portions of the foam body. This process eliminates the need for separate structural parts and the complex and multistep procedures required by the prior art in the fabrication of composite foam plastic assemblies.

Although the invention has been described with particular reference to specific practice and embodiments, it will be understood by those skilled in the art that the apparatus of the invention may be changed and modified without departing from the essential scope of the invention, as defined in the appended claims.

I claim:
1. In the process of producing a urethane foam structure by reacting an isocyanate with a suitable polyol, the method of producing a dense skin on selected surface portions of said foam which comprises: employing a foaming reagent activatable by the exothermic heat of reaction; and subjecting said selected surface portions of the foam during its synthesis to a temperature below that of the temperature of reaction to provide on said surface portions a self generated skin of desired thickness.

2. The method of molding a dense skin on selected surface portions of a foam plastic structure which comprises: employing as an ingredient of exothermically reactable foam-forming reactants a fluorocarbon blowing agent activatable by the exothermic heat of chemical reaction; and maintaining wall portions of said mold during formation of the foam at a temperature below that necessary for effective vaporization of said fluorocarbon to produce on surface portions of said foam contiguous said mold wall portions a surface coating of desired physical characteristics.

3. In the process of molding a foam plastic structure, the method of forming a hard durable skin on selected surface portions thereof, which comprises: forming a urethane linkage by the exothermic reaction of an isocyanate with a hydroxyl bearing compound; employing as an ingredient of the foam forming process a blowing agent activatable by the exothermic heat of chemical reaction; and subjecting selected surface portions of said foam during its formation to a mold forming surface maintained at a temperature below that of the effective vaporization temperature of said blowing agent to form, on said selected surface portions a dense coating of predetermined physical characteristics.

4. The process of producing a skin on selected surface portions of a foamed plastic structure, which comprises: employing a blowing agent generated on chemical reaction of exothermically reactable foam-forming reagents and vaporizable by the exothermic heat of chemical reaction; and subjecting selected surface portions of the evolving foam to a temperature below the effective vaporization temperature of said blowing agent to produce in regions contiguous such reduced temperature zones a surface coating of desired physical characteristics.

References Cited in the file of this patent

UNITED STATES PATENTS

| | | |
|---|---|---|
| 2,423,700 | Hardy | July 8, 1947 |
| 2,537,977 | Dulmage | Jan. 16, 1951 |
| 2,740,743 | Pace | Apr. 3, 1956 |
| 2,826,244 | Hurley | Mar. 11, 1958 |
| 2,898,626 | Alderfer et al. | Aug. 11, 1959 |
| 2,898,632 | Irwin et al. | Aug. 11, 1959 |
| 2,957,832 | Smitter et al. | Oct. 25, 1960 |
| 3,007,203 | Ammons | Nov. 7, 1961 |

FOREIGN PATENTS

| | | |
|---|---|---|
| 821,342 | Great Britain | Oct. 7, 1959 |